(12) United States Patent
Hochedez

(10) Patent No.: US 9,282,533 B2
(45) Date of Patent: Mar. 8, 2016

(54) METHOD FOR IMPROVING PAGING PERFORMANCES IN A WIRELESS ACCESS SYSTEM

(75) Inventor: Frédéric Hochedez, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 754 days.

(21) Appl. No.: 12/307,199

(22) PCT Filed: Jul. 2, 2007

(86) PCT No.: PCT/EP2007/056647
§ 371 (c)(1),
(2), (4) Date: Sep. 8, 2009

(87) PCT Pub. No.: WO2008/003679
PCT Pub. Date: Jan. 10, 2008

(65) Prior Publication Data
US 2010/0022256 A1    Jan. 28, 2010

(30) Foreign Application Priority Data
Jul. 3, 2006  (EP) .................................. 06291100

(51) Int. Cl.
*H04W 68/00* (2009.01)
*H04W 68/10* (2009.01)

(52) U.S. Cl.
CPC .............. *H04W 68/00* (2013.01); *H04W 68/10* (2013.01)

(58) Field of Classification Search
USPC .................................... 455/458, 426.1, 432.2
See application file for complete search history.

(56) References Cited

U.S. PATENT DOCUMENTS

| 5,748,100 | A | | 5/1998 | Gutman et al. | |
|---|---|---|---|---|---|
| 6,058,308 | A | * | 5/2000 | Kallin et al. | 455/432.3 |
| 6,108,518 | A | * | 8/2000 | Madour et al. | 340/7.25 |
| 2002/0094827 | A1 | | 7/2002 | Jou et al. | |
| 2003/0073449 | A1 | * | 4/2003 | Motegi et al. | 455/458 |
| 2004/0152475 | A1 | * | 8/2004 | Kim | 455/458 |
| 2005/0002346 | A1 | * | 1/2005 | Bichot | 370/312 |
| 2006/0009242 | A1 | * | 1/2006 | Ryu et al. | 455/458 |
| 2006/0040681 | A1 | * | 2/2006 | Julka et al. | 455/458 |
| 2006/0052117 | A1 | * | 3/2006 | Katsube et al. | 455/458 |

(Continued)

FOREIGN PATENT DOCUMENTS

| CN | 1198871 A | 11/1998 |
|---|---|---|
| EP | 1 633 162 A1 | 7/2005 |
| JP | 2004320388 | 11/2004 |

OTHER PUBLICATIONS

Sarikaya Xiaofeng Xu Vinod Kumar Choyi Andrew Krywaniuk Alcatel Claude Castelluccia Inria Rhone-Alpes B: "Mobile IPv6 Hierarchical Paging," IETF Standard-Working-Draft, Internet Engineering Task Force, IETF, CH, XP015034933, ISSN: 0000-0004, pp. 4-9, Sep. 2001.

(Continued)

*Primary Examiner* — Jinsong Hu
*Assistant Examiner* — Jean Chang
(74) *Attorney, Agent, or Firm* — Fay Sharpe LLP

(57) ABSTRACT

An object of the present invention is a method for improving paging performances in a wireless access system, said method comprising the steps of: —retransmitting a paging message in case of no response from a paged Mobile Station, —performing said retransmission at a Base Station level, —managing said retransmission at a Paging Controller level.

6 Claims, 3 Drawing Sheets

(56) References Cited

U.S. PATENT DOCUMENTS

2006/0089161 A1* 4/2006 Kim et al. .................... 455/458
2007/0191031 A1* 8/2007 Mohanty et al. .............. 455/458

OTHER PUBLICATIONS

International Search Report.

* cited by examiner

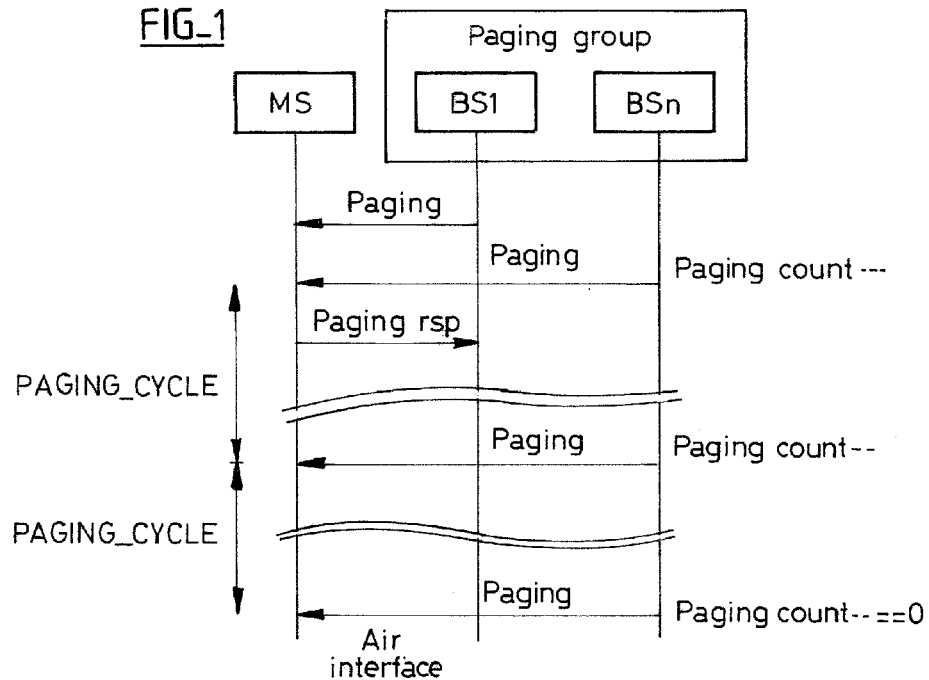
FIG_1
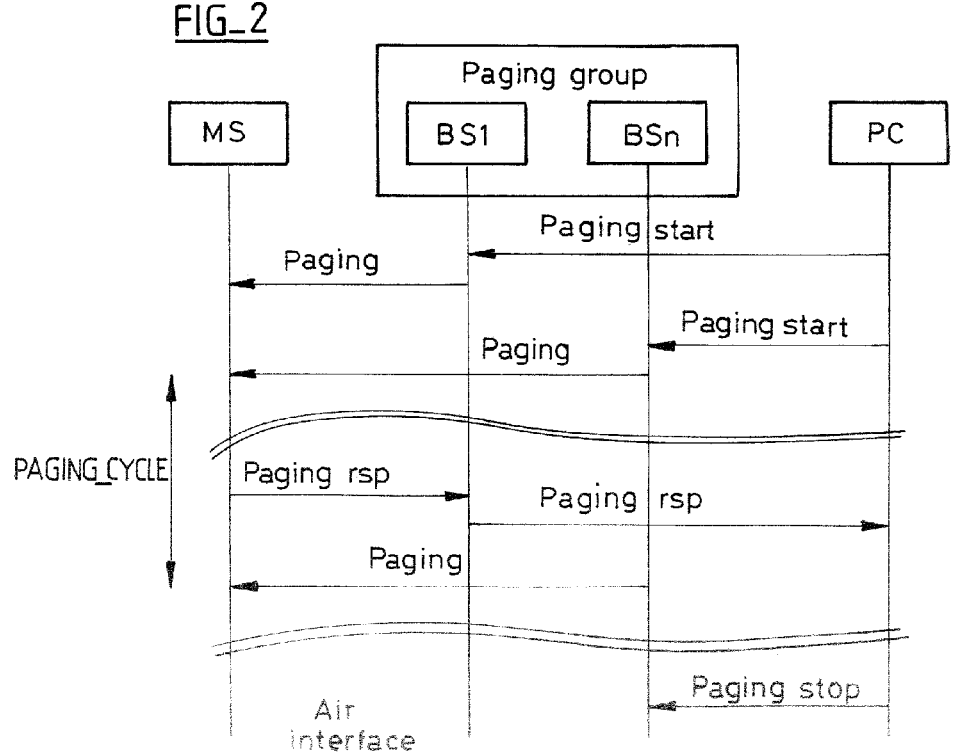
FIG_2

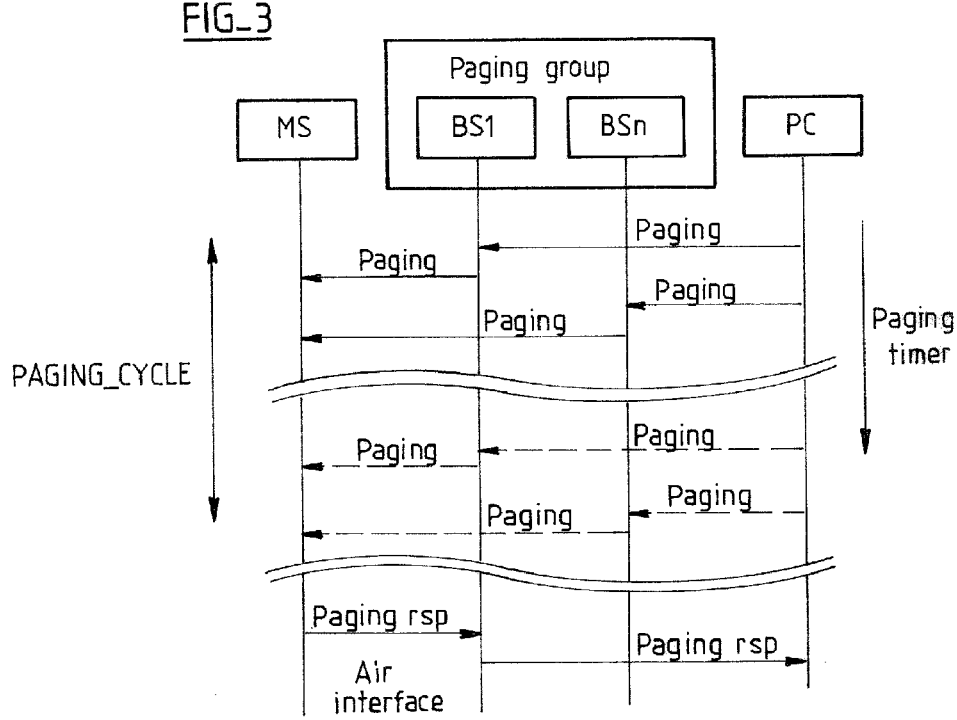
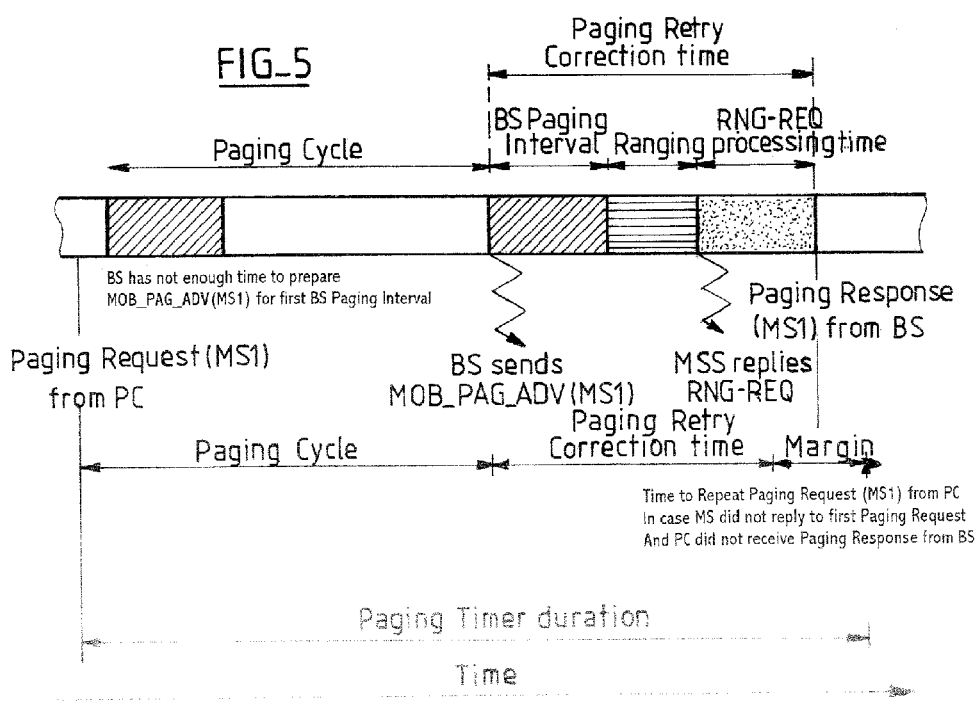

FIG_4

| Information Element | Description | Mandatory or Optional | Notes |
|---|---|---|---|
| MS ID | MS MAC address | M | MS Identification to point what is the required MS |
| PG ID | Paging Group Identifier | M | Paging Group ID MS is currently in |
| Paging Cycle | Paging Cycle of the MS as stored in Anchor PC | M | |
| Paging Offset | Paging Offset of the MS as stored in Anchor PC | M | |
| BS_ID(s) | Set of BS(s) in the PG that are required to page the MS in this paging announce operation | O | Mandatory if it's a multi-step paging procedure. If this TLV is not included, then, it is assumed to be a single step paging operation |
| L-BSID | Last reported BSID | O | Last reported BS included to optionally implement resource reservation on this BS or to identify a Paging subgroup |
| SF Info | Service Flow Info of the received data for Paging | O | Service Flow type and parameters to do prioritized paging based on the QoS type of calls and resource reservation |
| Paging start/Stop | 1 = start Paging | M | 1 = start Paging Operation<br>0 = stop Paging Operation |
| Number of tries | Number of times that the PagingAgent (i.e. the BS) should try to page the MS | C<br>Only applicable if Paging start/stop=1 | Number of tries=0 stands for infinite tries. The PagingAgent will continue paging this MS until it receives a Paging::Stop message for this MS<br>Number of tries>0 implies that the Paging Agent will try at most N times to page the MS |
| Authenticator ID | ID of the anchor authenticator for the MS | O | |
| Paging Cause | Indicating the Paging cause | M | 01 Location Update<br>02 Network Re-Entry, Incoming Data for Idle MS<br>03 Network Re-entry, required TEK re-authorization<br>04 Network Re-entry, required full security re-authorization<br>05 Network Re-entry, other network management |

METHOD FOR IMPROVING PAGING PERFORMANCES IN A WIRELESS ACCESS SYSTEM

The present invention generally relates to wireless access systems.

The present invention applies particularly (but not exclusively) to WIMAX. A description of WIMAX can be found in particular in IEEE 802.16e and WIMAX Forum standards.

A paging mechanism is specified in IEEE 802.16e standard. This paging mechanism is briefly recalled in relation with FIG. 1.

A paging message shall be broadcast by all the Base Stations (BSs) of a paging area (also called Paging Group), in particular to indicate the presence of downlink traffic pending targeted to a Mobile Station (MS) in idle mode state end located in this Paging Group. The paging message is broadcast over the air during a time interval called BS Paging Interval.

After transmitting a paging message, if a BS does nor receive a response from the paged MS, the BS shall retransmit the paging message in the next BS Paging Interval until the number of retransmissions (called Paging Retry Count) reaches a predetermined value (noted max Paging Retry Count). The period of BS Paging Interval is called Paging Cycle.

The paging related control protocol and messages between Paging Controller (PC) and Paging Agent (PA) is specified in WIMAX Forum standard. PA is a functional entity that handles the interaction between PC and IEEE 802.16e specified Paging related functionality implemented in the BS. Paging related messages between PC and PA in particular include a Paging Announce message ( MS_Paging_Announce) sent by PC to PA and corresponding to a request for the transmission of a paging message.

With the above-recalled paging mechanism as specified in IEEE 802.16e standard, if the MS responds to the paging message on a BS, then all other BSs of the Paging Group will keep on broadcasting the paging message until Paging Retry Count reaches a predetermined value.

A mechanism allowing to request all other BSs to stop the broadcast (also called hereinafter paging start/stop mechanism) has been introduced in the Wimax Forum standard and is recalled in relation with FIG. 2.

In this mechanism, an information called Paging Start/Stop has been introduced in the Paging Announce message, to indicate to the BS when it should start and stop transmission of paging messages.

However, as recognized by the present invention, depending on when the stop information is given to the BS, the situation after the introduction of such paging start/sop mechanism may be equivalent to the situation before the introduction of such paging start/sop mechanism. One or more useless paging messages may be broadcast after the MS has responded to the first paging message; indeed, it is difficult to guarantee reliable delivery of the Paging Stop to all recipients. Therefore there is a risk that a certain number of BSs will keep on paging, with the consequent waste of precious resources on the radio interface, and increase of the overall interference level in the system. Moreover, two paging messages (stop and start) must be sent.

The present invention in particular enables to solve part or all of such problems, or to avoid part or all of such drawbacks. More generally, the present invention enables to improve paging performances in such systems.

These and other objects are achieved, in one aspect of the present invention, by a method for improving paging performances in a wireless access system, said method comprising the steps of:
  retransmitting o paging message in case of no response from a paged Mobile Station,
  performing said retransmission at a Base Station level,
  managing said retransmission at a Paging Controller level.

These and other objects are achieved, in another aspect of the present invention, by a Paging Controller for a wireless access system, comprising:
  means for managing retransmission of a paging message in case of no response from a paged Mobile Station.

These and other objects are achieved, in another aspect of the present invention, by a Base Station tor a wireless access system, comprising:
  means for retransmitting a paging message in case of no response from a paged Mobile Station, upon request from a Paging Controller.

These and other objects are achieved, in another aspect of the present invention, by a Paging Agent comprising:
  means for receiving, from a Paging Controller, a request for retransmission of a paging message in case of no response from a paged Mobile Station.

These and other objects of the present invention will become more apparent from the following description taken in conjunction with the accompanying drawings:

FIG. 1 is intended to illustrate the above-recalled paging mechanism,

FIG. 2 is intended to illustrate the above-recalled paging start/stop mechanism, FIG. 3 is intended to illustrate an example of a method according to the present invention, according to one aspect of the present invention, FIG. 4 is intended to illustrate the structure of a Paging Announce message, according to another aspect of the present invention FIG. 5 is intended to illustrate an example of a method according to the present invention, according to another aspect of the present invention.

The present invention may also be explained as follows.

In one of its different aspects, the present invention proposes, instead of managing paging message retransmission at BS level (as is the case in the above recalled prior art), to manage it at PC level.

In other words, in one of its different aspects, the present invention proposes a method for improving paging performances in a wireless access system, said method comprising the steps of:
  retransmitting a paging message in case of no response from a paged Mobile Station,
  performing said retransmission at a Base Station level,
  managing said retransmission at a Paging Controller level.

In another aspect, the present invention proposes that the BS shall only broadcast a paging message over the air only once the PC requests it.

In other words, according to another of its different aspects, the present invention proposes a method for improving paging performances in a wireless access system, comprising a step of:
  performing retransmission of a paging message at Base Station level, upon request from Paging Controller.

In the present invention, paging broadcast is centralized for all BSs In the same paging, group.

If the MS responds to the paging message on a BS then all other BSs will automatically stop broadcasting paging message since the PC will not send again a paging request.

The paging message repetition is fully managed by the PC, the BSs act as slaves compared to what is currently specified in IEEE 802.16e standard.

In case the MS responds immediately (dashed arrow sequence in FIG. 3 not executed) then only "n" paging messages (where "n" is the number of BSs in the Paging Group) are broadcast over the air.

In current IEEE 802.16e standard, in case no mechanism to stop paging message broadcast is implemented, n+(n−1)* (max Paging Retry Count−1) paging messages are broadcast over the air.

Moreover, the PC has only one paging message to send instead of two messages (paging stop is not needed).

In another of its different aspects, the present invention proposes, in order to fit with the above-rcalled paging start/ stop mechanism as defined by Wimax Forum standard, to introduce a new information in the Paging Announce message sent by PC to PA, to indicate that the paging message shall be sent only one time (or more generally N times, with N higher or equal to 1), and no stop paging request will be sent. The present invention proposes to introduce a new IE (Information Element) in the message MS_Paging_Announce sent by PC to PA. This new IE (noted "number of tries"), indicates the number of times that the PA should try to page the MS.

For example:
Number of tries=0 stands for infinite tries: The PA will continue paging the MS until it receives a Paging Stop message for this MS.
Number of tries>0 implies that the PA will try at most N times to page the MS.

The corresponding structure of the MS_Paging_Announce message is illustrated in FIG. 4.

In other words, in another of its different aspects, the present invention proposes a method for improving paging performances in a wireless access system, comprising a step of:

sending, by a Paging Controller to a Paging Agent, paging control information enabling management, at Paging Controller level, of retransmission performed at Base Station level.

Advantageously, said method comprises a step of:
sending said paging control information in a Paging Announce message.

Advantageously, said paging control information corresponds to a number N of tries, by which a Base Station will try to page the Mobile Station.

Advantageously:
a positive number N of tries implies that the Paging Agent will try at most N times to page the Mobile Station,
a number N of tries equal to zero implies that the Paging Agent will continue to page the Mobile Station until it receives a Paging Stop message for the Mobile Station.

A value of N such that the PA will try at most N times to page the MS may for example be configured by the network operator, for example as a function of radio and/or traffic conditions. For example, N may be increased when radio and/or traffic conditions are degrading, or decreased otherwise, enabling in this latter case to make the paging process faster.

The present invention also has for its object different entites of a wireless access network (in particular Paging Controller, Base Station, Paging Agent) for performing a method according to the present invention, according to the various aspects described above.

In particular, the present invention also has for its object a Paging Controller for a wireless access system, comprising:

means for managing retransmission of a paging message in case of no response from a paged Mobile Station.

In particular, the present invention also has for its object a Base Station for a wireless access system, comprising:
means for retransmitting a paging message in case of no response from a paged Mobile Station, upon request from a Paging Controller.

In particular, the present invention also has for its object a Paging Agent comprising:
means for receiving, from a Paging Controller, a request for retransmission of a paging message in case of no response from a paged Mobile Station.

The detailed implementation of the above-mentioned means does not raise any special problem for a person skilled in the art, and therefore such means do not need to be more fully disclosed than has been made above, by their function, for a person skilled in the art.

Another aspect of the present invention is now described, in relation with FIG. 5. This other aspect can advantageously be used with one or more of the aspects already described above; nevertheless it is independent and could also be used without said aspects already described above.

As recalled above, the paging mechanism as specified in IEEE 802.16e standard is such that, when the BS receives a paging request from the PC, it shall broadcast the paging message over the air during the next coming BS Paging Interval (this interval is computed according to parameters shared by the BS and the MS, i.e. Paging Cycle, Paging Offset).

As recognized by the present invention, such a synchronization with the BS Paging Interval may also lead the BS to broadcast useless and supernumerary paging messages.

The present invention proposes to use the following mechanism, in order to avoid such drawbacks, or more generally to improve paging performances in such systems.

As recalled above, the BS may have to retransmit the paging message before receiving a paging response from the MS. The present invention proposes to manage the retransmission period thanks to a repetition timer whose value shall be computed as follows in order to also minimize the radio resource consumption.

The present invention proposes that the PC shall manage retransmission of paging message in case no response is received from the MS. For that purpose, the PC shall manage a Paging Timer as well as a Paging Retry Count.

For example, the Paging Timer may be triggered when a Paging Request is sent by the PC. If a response is received from the paged Mobile Station before the expiration of the Paging Timer, a new Paging Request is not sent by the PC. Otherwise a new Paging Request is sent by the PC.

The Paging Timer value shall be computed according to the Paging Cycle value allocated to the MS (Paging Cycle$_{MS}$). Indeed, it is useless to try to page an MS outside its Paging Listening Interval. The Paging Timer is advantageously computed as follows:

$$\text{Paging Timer duration} = \text{Paging Cycle}_{MS} \times \text{Frame duration} + \text{Paging Retry Correction} + \text{Margin}$$

where, as illustrated in FIG. 5;
Paging Retry Correction is an additional time that takes into account the duration of the BS Paging Interval, the time needed for the MS to re-enter the network from idle mode (i.e. CDMA ranging) and the time the BS needs to process the MS response (i.e. RNG-RFQ message). This correction allows for not repeating unnecessarily the paging message over the air in case the paging message misses the current or first coming corresponding BS Paging Interval and thus is only processed into the next corresponding BS Paging Interval.

Margin is an additional duration that may be used to adjust the Paging Timer duration in order to take into account transmission time of Paging Response as well as time the PC needs to process the paging Response.

In other words, according to another of its different aspects, the present invention also proposes a method for improving paging performances in a wireless access system, comprising a step of using a Paging Timer whose duration is set taking into account, in addition to a Paging Cycle, at least one of the following parameters:
- duration of a Paging Interval,
- time needed for the MS to re-enter the network from idle mode state,
- time needed to process the MS response,
- transmission time of paging response.

Said method may further comprise the steps of:
- triggering said Paging Timer upon the sending of a Paging Request (if management of retransmission is performed at Paging Controller level) or of a paging message (if management of retransmission is performed at Base Station level),
- sending a new Paging Request (or new paging message) if no paging response is received before the expiration of said Paging Timer.

The present invention also has for its object different entites of a wireless access network (in particular Paging Controller, Base Station) for performing such a method.

The present invention therefore also has for its object a Paging Controller for a wireless access system, comprising means for using a Paging Timer whose duration is set taking into account at least one of the following parameters:
- duration of a Paging Interval,
- time needed for the MS to re-enter the network from idle mode state,
- time needed to process the MS response,
- transmission time of paging response.

Said paging Controller may further comprise:
- means for triggering said Paging Timer upon the sending of a Paging Request,
- means for sending a new Paging Request if no paging response is received before the expiration of said Paging Timer.

The detailed implementation of the above-mentioned means does not raise any special problem for a person skilled in the art, and therefore such means do not need to be more fully disclosed than has been made above, by their function, for a person skilled in the art.

The invention claimed is:

1. A method for improving paging performances in a wireless access system wherein a Mobile Station is paged by a plurality of Paging Agents, and wherein at least one of said Paging Agents can continue to page the Mobile Station until the Paging Agent receives a Paging Stop message for the Mobile Station from a Paging Controller, the method comprising:
   sending a Paging Announce message from the Paging Controller to the Paging Agent, said Paging Announce message including paging control information, to cause the Paging Agent to continue to page the Mobile Station either for a duration indicated by said paging control information or until the Paging Agent receives a Paging Stop message for the Mobile Station;
   wherein:
   said paging control information represents a number N of times that the Paging Agent should try to page the Mobile Station, and
   a number N of times standing for infinite tries causes the Paging Agent to continue to page the Mobile Station until it receives a Paging Stop message for the Mobile Station.

2. The method of claim 1, wherein:
   a number N of times greater than or equal to 1 indicates that a Paging message will be sent N times by the Paging Agent, and no Stop Paging request will be sent by the Paging Controller.

3. A Paging Controller for a wireless access system wherein a Mobile Station is paged by a plurality of Paging Agents, and wherein at least one of said Paging Agents can continue to page the Mobile Station until the Paging Agent receives a Paging Stop message for the Mobile Station from the Paging Controller, the Paging Controller comprising:
   at least one processor configured to send a Paging Announce message to a Paging Agent, said Paging Announce message including paging control information, to cause said Paging Agent to continue to page the Mobile Station either for a duration indicated by said paging control information or until the Paging Agent receives a Paging Stop message for the Mobile Station;
   wherein:
   said paging control information represents a number N of times that the Paging Agent should try to page the Mobile Station, and
   a number N of times standing for infinite tries causes the Paging Agent to continue to page the Mobile Station until it receives a Paging Stop message for the Mobile Station.

4. The Paging Controller of claim 3, wherein:
   a number N of times greater than or equal to 1 indicates that a Paging message will be sent N times by the Paging Agent, and no Stop Paging request will be sent by the Paging Controller.

5. A Paging Agent for a wireless access system wherein a Mobile Station is paged by a plurality of Paging Agents, and wherein at least one of the Paging Agents can continue to page the Mobile Station until the Paging Agent receives a Paging Stop message the Mobile Station from a Paging Controller, the Paging Agent comprising:
   at least one processor configured to receive, from the Paging Controller, a Paging Announce message including paging control information, causing the Paging agent to continue to page the Mobile Station either for a duration indicated by said paging control information or until the Paging Agent receives a Paging Stop message for the Mobile Station;
   wherein:
   said paging control information represents a number N of times that the Paging Agent should try to page the Mobile Station, and
   a number N of times standing for infinite tries causes the Paging Agent to continue to page the Mobile Station until the Paging Agent receives a Paging Stop message for the Mobile Station.

6. The Paging Agent of claim 5, wherein:
   a number N of times greater than or equal to 1 indicates that a Paging message will be sent N times by the Paging Agent, and no Stop Paging request will be sent by the Paging Controller.

* * * * *